(12) United States Patent
Lim et al.

(10) Patent No.: US 10,208,195 B2
(45) Date of Patent: Feb. 19, 2019

(54) POLYPROPYLENE RESIN COMPOSITION AND CABLE CLADDED WITH THE SAME

(71) Applicant: LG CHEM, LTD., Seoul (KR)

(72) Inventors: Sung Hwan Lim, Daejeon (KR); Byung Wook Lee, Daejeon (KR); Gun Ko, Daejeon (KR); Soo Min Lee, Daejeon (KR); Sang Wook Na, Daejeon (KR)

(73) Assignee: LG CHEM, LTD., Seoul (KR)

( * ) Notice: Subject to any disclaimer, the term of this patent is extended or adjusted under 35 U.S.C. 154(b) by 105 days.

(21) Appl. No.: 15/511,549

(22) PCT Filed: Jun. 12, 2016

(86) PCT No.: PCT/KR2016/006225
§ 371 (c)(1),
(2) Date: Mar. 15, 2017

(87) PCT Pub. No.: WO2016/204459
PCT Pub. Date: Dec. 22, 2016

(65) Prior Publication Data
US 2017/0292015 A1 Oct. 12, 2017

(30) Foreign Application Priority Data

Jun. 17, 2015 (KR) .................. 10-2015-0085817
Jun. 9, 2016 (KR) .................. 10-2016-0071762

(51) Int. Cl.
| | | |
|---|---|---|
| *C08L 53/02* | (2006.01) | |
| *C08L 71/12* | (2006.01) | |
| *C08L 23/14* | (2006.01) | |
| *C08K 5/00* | (2006.01) | |
| *H01B 3/42* | (2006.01) | |
| *H01B 3/44* | (2006.01) | |

(52) U.S. Cl.
CPC ............. *C08L 23/14* (2013.01); *C08K 5/00* (2013.01); *C08K 5/0066* (2013.01); *C08L 53/025* (2013.01); *C08L 71/12* (2013.01); *H01B 3/427* (2013.01); *H01B 3/441* (2013.01); *H01B 3/442* (2013.01); *C08L 2201/02* (2013.01); *C08L 2203/202* (2013.01)

(58) Field of Classification Search
CPC ...... C08L 23/12; C08L 123/14; C08L 53/005; C08L 53/02; C08L 53/025; C08L 71/12; C08L 71/123; C08L 71/126
See application file for complete search history.

(56) References Cited

U.S. PATENT DOCUMENTS

| | | | | |
|---|---|---|---|---|
| 2010/0122845 A1* | 5/2010 | Guo | ............... | C08L 23/06 174/72 A |
| 2011/0266024 A1* | 11/2011 | Qiu | ............... | C08K 3/016 174/110 SR |
| 2012/0037396 A1 | 2/2012 | Gu | | |
| 2013/0231430 A1* | 9/2013 | I | ............... | C08L 53/025 524/323 |
| 2013/0253105 A1* | 9/2013 | Shan | ............... | C08K 5/3492 524/100 |

FOREIGN PATENT DOCUMENTS

| | | |
|---|---|---|
| CN | 102858873 A | 1/2013 |
| EP | 2217647 B1 | 10/2013 |
| EP | 2947121 A1 | 11/2015 |
| JP | 2010-509454 A | 3/2010 |
| JP | 2012-119087 A | 6/2012 |
| KR | 10-2010-0017356 A | 2/2010 |
| KR | 10-2014-0054104 A | 5/2014 |
| KR | 10-2014-0103700 A | 8/2014 |
| WO | 2012/174712 A1 | 12/2012 |
| WO | 2014-075291 A1 | 5/2014 |

* cited by examiner

*Primary Examiner* — Jeffrey C Mullis
(74) *Attorney, Agent, or Firm* — Dentons US LLP

(57) ABSTRACT

The present invention relates to a polypropylene resin composition and a cable cladded with the same. More particularly, the present invention relates to a polypropylene resin composition, including 25 to 35% by weight of a polypropylene polymer, 15 to 25% by weight of a styrene block copolymer, 15 to 25% by weight of a poly(arylene ether) resin, 26 to 35% by weight of a phosphorus flame retardant, and 0 to 10% by weight of a processing additive.

In accordance with the present invention, a polypropylene resin composition including a small amount of flame retardant but exhibiting excellent flame resistance, insulation performance, processability, and property balance, and a cable cladded with the same are provided.

17 Claims, No Drawings

POLYPROPYLENE RESIN COMPOSITION AND CABLE CLADDED WITH THE SAME

CROSS-REFERENCE TO RELATED APPLICATION(S)

This application is a National Stage Entry of International Application No. PCT/KR2016/006225, filed Jun. 12, 2016, and claims the benefit of and priority to Korean Application No. 10-2015-0085817, filed on Jun. 17, 2015, and Korean Application No. 10-2016-0071762, filed on Jun. 9, 2016 all of which are hereby incorporated by reference in their entirety for all purposes as if fully set forth herein.

The present invention relates to a polypropylene resin composition, and more particularly to a polypropylene resin composition including a small amount of flame retardant but exhibiting excellent flame resistance, insulation performance, processability, and property balance, and a cable cladded with the same.

BACKGROUND ART

Recently, in the cable industry, various materials have been introduced as substituents for PVC. Thereamong, olefin-based resin used as a cable material has attracted attention in various fields due to stable properties, relatively broad processing conditions, and excellent insulation performance of the resin. In addition, olefin-based resin has competitive price and stable processability, thereby being able to be molded under various conditions regardless of the size of a cable.

However, such olefin-based resin also has a limitation in realizing the flame retardancy of a cable. In particular, in a market where eco-friendliness arises, realization of flame retardancy by introducing a halogen-free flame retardant to an olefin-based resin is a great subject in developing a flame-retardant material.

As one example to address the aforementioned problem, KR 10-2010-0017356 A introduces use of a metal hydroxide-based flame retardant. However, the metal hydroxide-based flame retardant should be introduced in an amount of 70% or more to realize sufficient flame retardancy. In such a situation, there are difficulties in realizing the appearance of a cable, and thus, fundamental problems of an olefin-based resin are still present.

DISCLOSURE

Technical Problem

Therefore, the present invention has been made in view of the above problems, and it is one object of the present invention to provide a polypropylene resin composition including a small amount of flame retardant but exhibiting excellent flame resistance, insulation performance, processability, and property balance.

It is another object of the present invention to provide a cable cladded with the polypropylene resin composition.

The above and other objects can be accomplished by the present invention described below.

Technical Solution

In accordance with an aspect of the present invention, the above and other objects can be accomplished by the provision of a polypropylene resin composition including 25 to 35% by weight of a polypropylene polymer, 15 to 25% by weight of a styrene block copolymer, 15 to 25% by weight of a poly(arylene ether) resin, 26 to 35% by weight of a phosphorus flame retardant, and 0 to 10% by weight of a processing additive.

In accordance with another aspect of the present invention, there is provided a cable, an outermost layer of which is cladded with the polypropylene resin composition.

Advantageous Effects

As apparent from the above description, the present invention provides a polypropylene resin composition including a small amount of flame retardant but exhibiting excellent flame resistance, insulation performance, processability, and property balance, and a cable cladded with the same.

BEST MODE

Hereinafter, the present invention is described in detail.

The present inventors applied poly(arylene ether) resin, etc. to a polypropylene resin to satisfy various specifications required for cables. As a result, the present inventors confirmed that various specifications required for a cable may be satisfied and flame retardancy may be realized without use of an excessive amount of a flame retardant, thus completing the present invention.

A polypropylene resin composition of the present invention includes a polypropylene resin composition including 25 to 35% by weight of a polypropylene polymer, 15 to 25% by weight of a styrene block copolymer, 15 to 25% by weight of a poly(arylene ether) resin, 26 to 35% by weight of a phosphorus flame retardant, and 0 to 10% by weight of a processing additive.

Hereinafter, each of the ingredients constituting the polypropylene resin composition is described in detail.

In an embodiment, the polypropylene polymer may be a polypropylene polymer; or a copolymer of propylene and one or more olefins selected from the group consisting of ethylene, 1-butene, 4-methyl-1-pentene, 1-hexene, and 1-octene. In another embodiment, the polypropylene polymer may be one or more selected from the group consisting of a polypropylene polymer, a polypropylene copolymer, a propylene-alpha-olefin copolymer, a propylene-ethylene copolymer, a propylene-butene copolymer, and a propylene-ethylene-butene copolymer.

An ethylene-butene rubber (EBR) content in the polypropylene polymer may be, for example, 1 to 20% by weight, 1 to 15% by weight, or 5 to 10% by weight. Within this range, superior insulation performance is provided.

The polypropylene polymer may have, for example, a melt index (230° C./2.16 kg) of 16 to 25 g/10 min, 18 to 25 g/10 min, or 20 to 25 g/10 min. Within this range, superior property balance and excellent processability are provided.

The amount of the polypropylene polymer may be, for example, 25 to 35% by weight, or 27 to 33% by weight based on a total weight of the resin composition according to the present invention. Within this range, excellent insulation performance and property balance are provided.

The polypropylene polymer may be prepared according to a general method. As a specific example, propylene may be copolymerized with α-olefin using massive, slurry, or gas-phase polymerization in the present of a suitable catalyst.

The polypropylene polymer may be, for example, a polypropylene random copolymer or a block copolymer. Preferably, the polypropylene polymer may be a polypropylene random copolymer.

In an embodiment, a propylene unit and a comonomer unit may be randomly distributed in a final copolymer of the polypropylene random copolymer. As a specific example, a block containing only the comonomer unit is not formed, and the comonomer may be uniformly distributed, as a single unit, in the polypropylene block constituting a polymer chain. In this case, excellent insulation performance, processability, and property balance are provided. The distribution of the comonomer may be controlled, for example, by changing a process temperature.

The styrene block copolymer, which is not specifically limited, may be, for example, one or a mixture of two or more selected from the group consisting of a styrene-butadiene copolymer, a styrene-ethylene-propylene copolymer, a styrene-isoprene copolymer, an α-methylstyrene-butadiene copolymer, a styrene-butadiene-styrene copolymer, a styrene-ethylene-propylene-styrene copolymer, a styrene-ethylene-butylene-styrene copolymer, a styrene-(ethylene-butylene/styrene copolymer)-styrene copolymer, a styrene-isoprene-styrene copolymer, an α-methylstyrene-butadiene-α-methylstyrene copolymer, and variants formed by selectively hydrogenating the same.

As a specific example, the styrene block copolymer may be a styrene-ethylene-butylene-styrene copolymer. The styrene-ethylene-butylene-styrene copolymer may be, for example, a linear polymer compound.

A styrene content in the styrene block copolymer may be, for example, 10 to 20% by weight, 10 to 18% by weight, or 10 to 15% by weight. Within this range, superior elongation and hardness are provided.

The weight average molecular weight of the styrene block copolymer may be, for example, 80,000 to 120,000 g/mol, 85,000 to 115,000 g/mol, or 90,000 to 110,000 g/mol. Within this range, superior flexibility and flowability are provided.

The amount of the styrene block copolymer may be, for example, 15 to 25% by weight or 17 to 23% by weight based on a total weight of the resin composition according to the present invention. Within this range, excellent processability and property balance are provided.

The poly(arylene ether) resin is not specifically limited so long as it is a general material used as a cable material. For example, the poly(arylene ether) resin may be a single polymer having a repeat unit represented by [Formula 1] or [Formula 2] below or a copolymer including a repeat unit represented by [Formula 1] or [Formula 2] below:

$$\text{---Ar}(R_a)_n\text{---O---} \qquad \text{[Formula 1]}$$

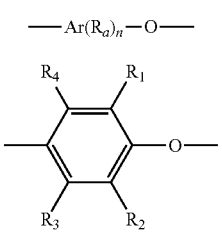

[Formula 2]

wherein Ra, $R_1$, $R_2$, $R_3$, and $R_4$, which are substituents for the arylene group (Ar) or phenylene group, are each independently or simultaneously a hydrogen, chlorine, bromine, iodine, methyl, ethyl, propyl, allyl, phenyl, methylbenzyl, chloromethyl, bromomethyl, cyanoethyl, cyano, methoxy, phenoxy, or nitro group; n is an integer of 4 to 20; and Ar is a $C_7$ to $C_{20}$ arylene group. For example, each of $R_1$ and $R_2$ may be an alkyl group or a $C_1$ to $C_4$ alkyl group, and each of $R_3$ and $R_4$ may be hydrogen.

The poly(arylene ether) resin may be, for example, a poly(phenylene ether)-based resin.

In a more specific example, the poly(phenylene ether)-based resin may be a poly(arylene ether) resin including a repeat unit represented by [Formula 3] below:

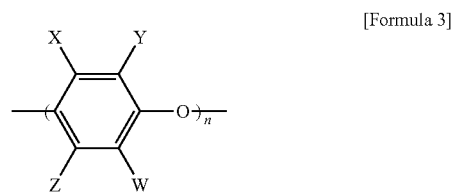

[Formula 3]

wherein W, X, Y, and Z are each independently or simultaneously a hydrogen, chlorine, bromine, iodine, methyl, ethyl, propyl, allyl, phenyl, methylbenzyl, chloromethyl, bromomethyl, cyanoethyl, cyano, methoxy, phenoxy, or nitro group; and n, which is the number of repeat units, is an integer of 3 to 1000, an integer of 3 to 100, or an integer of 5 to 60.

The single polymer of the poly(arylene ether) resin is not specifically limited and, as specific examples, may be one or more selected from the group consisting of poly(2,6-dimethyl-1,4-phenylene) ether, poly(2,6-diethyl-1,4-phenylene) ether, poly(2-methyl-6-propyl-1,4-phenylene) ether, poly(2,6-dipropyl-1,4-phenylene) ether, poly(2-ethyl-6 propyl-1,4-phenylene) ether, poly(2,6-dimethoxy-1,4-phenylene) ether, poly(2,6-dicholromethyl-1,4-phenylene) ether, poly(2,6-dibromomethyl-1,4-phenylene) ether, poly(2,6-diphenyl-1,4-phenylene) ether, and poly(2,5-dimethyl-1,4-phenylene) ether.

In addition, the copolymer of the poly(arylene ether) resin is not specifically limited and, as a specific example, may be a poly(phenylene ether)-based copolymer, a main chain of which has a poly(phenylene ether) structure, such as a copolymer of 2,6-dimethylphenol and 2,3,6-trimethylphenol, a copolymer of 2,6-dimethylphenol and o-cresol, or a copolymer of 2,3,6-trimethylphenol and o-cresol.

The poly(arylene ether) resin may be, other than the single polymer and copolymer of the poly(arylene ether) resin, for example, a modified poly(arylene ether) resin obtained by reacting the single polymer or copolymer of the poly(arylene ether) with an α,β-unsaturated carboxylic acid or a derivative thereof, a styrene or a derivative thereof, or an unsaturated carboxylic acid or a derivative thereof at 30 to 350° C., in a molten state, a solution state, or a slurry state, in the presence or absence of an initiator.

The intrinsic viscosity (measured under conditions of 0.5 g/dl, chloroform solution, and 30° C.) of the poly(arylene ether) resin may be, for example, 0.25 to 0.50 dl/g, 0.30 to 0.50 dl/g, or 0.35 to 0.45 dl/g.

The amount of the poly(arylene ether) resin may be, for example, 15 to 25% by weight, 15 to 23% by weight, or 15 to 20% by weight based on a total weight of the resin composition according to the present invention. Within this range, suitable flame resistance may be realized and, when extruded into an electric wire, flexibility and an elongation required with respect to specifications are satisfied.

The phosphorus flame retardant may be, for example, a general phosphorus flame retardant used to provide flame resistance to a synthetic resin or a resin composition. In another embodiment, a halogen-based flame retardant might not be used to provide eco-friendly flame resistance. In addition, phosphorus flame retardants, except for red phosphorus, may be used.

The phosphorus flame retardant may be, for example, one or more selected from the group consisting of an organometallic phosphinate-based flame retardant, a nitrogenous/phosphorus flame retardant in solid state at room temperature, and an organophosphate-based flame retardant in liquid state at room temperature. Preferably, the phosphorus flame retardant may be two or more selected from the group consisting of an organometallic phosphinate-based flame retardant, a nitrogenous/phosphorus flame retardant in solid state at room temperature, and an organophosphate-based flame retardant in liquid state at room temperature. In this case, superior flame resistance and processability are provided.

The room temperature may refer to general temperature range, i.e., 22 to 23° C., or 20 to 26° C.

The amount of the phosphorus flame retardant may be, for example, 26 to 35% by weight, 27 to 33% by weight, or 28 to 32% by weight based on a total weight of the resin composition according to the present invention. Within this range, superior flame resistance and processability are provided.

The organometallic phosphinate-based flame retardant may be, for example, metal dialkyl phosphinate. As a specific example, the organometallic phosphinate-based flame retardant may be aluminum diethyl phosphinate. In this case, although the organometallic phosphinate-based flame retardant is used in a small amount, sufficient flame resistance may be exhibited and other properties are not affected.

A phosphorus (P) content in the organometallic phosphinate-based flame retardant may be, for example, 10 to 50% by weight, 15 to 40% by weight, or 20 to 30% by weight. Within this range, flame resistance is exhibited and other properties are not negatively affected.

The amount of the organometallic phosphinate-based flame retardant may be, for example, 5 to 30% by weight, 10 to 25% by weight, or 10 to 20% by weight based on a total weight of the resin composition according to the present invention. Within this range, superior flame resistance efficiency is provided.

The nitrogenous/phosphorus flame retardant in solid state at room temperature may be, for example, a nitro-phosphate based flame retardant or a phosphate salt flame retardant. As a specific example, the nitrogenous/phosphorus flame retardant in solid state at room temperature may be melamine-polyphosphate.

A nitrogen (N) content in the nitrogenous/phosphorus flame retardant in solid state at room temperature may be, for example, 20 to 60% by weight, 30 to 50% by weight, or 35 to % by weight. Within this range, flame resistance is exhibited and other properties are not negatively affected.

In another embodiment, a phosphorus (P) content in the nitrogenous/phosphorus flame retardant in solid state at room temperature may be 5 to 40% by weight, 5 to 30% by weight, or 10 to 20% by weight. Within this range, flame resistance is exhibited and other properties are not negatively affected.

The amount of the nitrogenous/phosphorus flame retardant in solid state at room temperature may be, for example, 1 to 25% by weight, 3 to 20% by weight or 5 to 15% by weight based on a total weight of the resin composition according to the present invention. Within this range, superior flame resistance efficiency is provided.

The organophosphate-based flame retardant in liquid state at room temperature may be, for example, bisphenol A bis(dialkyl phosphate), bisphenol A bis(diaryl phosphate), or a combination thereof. As a specific example, the organophosphate-based flame retardant in liquid state at room temperature may be bisphenol-A-diphenylphosphate. In this case, plasticity and surface properties, as well as flame resistance, are improved.

A phosphorus (P) content in the organophosphate-based flame retardant in liquid state at room temperature may be, for example, 1 to 20% by weight, 3 to 15% by weight, or 5 to 10% by weight. Within this range, superior plasticity and surface properties are provided.

The amount of the organophosphate-based flame retardant in liquid state at room temperature may be, for example, 1 to 15% by weight, 1 to 10% by weight, or 3 to 8% by weight based on a total weight of the resin composition according to the present invention. Within this range, superior flame resistance, plasticity and surface properties are provided.

The processing additive may be one or more selected from the group consisting of, for example, a lubricant, an antioxidant, a light stabilizer, a chain extender, a reaction catalyst, a release agent, a pigment, a dye, an antistatic agent, an antimicrobial agent, a processing aid, a metal deactivator, a smoke suppressant, a fluorine-based anti-dripping agent, an inorganic filler, a glass fiber, an antifriction and antiwear agent, and a coupling agent.

The amount of the processing additive may be, for example, 0 to 10% by weight, 0.1 to 8% by weight, or 2 to 6% by weight based on a total weight of the resin composition according to the present invention. Within this range, superior processability and property balance are provided.

The polypropylene resin composition may have, for example, a melt index (230° C./2.16 kg) of 1 g/10 min or more, 1 to 30 g/10 min, or 2 to 10 g/10 min. Within this range, superior processability is provided.

The polypropylene resin composition may have, for example, a tensile strength of 100 kgf/cm$^2$ or more, 100 to 200 kgf/cm$^2$, or 100 to 125 kgf/cm$^2$. Within this range, the polypropylene resin composition is suitable for application to a cable.

The polypropylene resin composition may have, for example, a tensile elongation of 150% or more, 150 to 350%, or 200 to 290%. Within this range, the polypropylene resin composition is suitable for application to a cable.

The polypropylene resin composition may have, for example, a Shore A hardness of 80 or more, 80 to 95, or 85 to 95. Within this range, the polypropylene resin composition is suitable for application to a cable.

In addition, the cable of the present invention is characterized in that an outermost layer thereof is cladded with the polypropylene resin composition.

The cable may be, for example, a multi-core cable.

A method of manufacturing the cable is not specifically limited so long as the cable is manufactured using the polypropylene resin composition as an insulating or cladding material.

The aforementioned description is provided only to illustrate embodiments according to the present invention. Those skilled in the art will appreciate that various modifications, additions and substitutions are possible, without departing from the scope and spirit of the invention. Therefore, it is obvious that the modifications, additions and substitutions are included in the scope of the present invention.

EXAMPLE

A polypropylene polymer (A), a styrene block copolymer (B-1 and B-2), a poly(arylene ether) resin (C), a phosphorus flame retardant (D), and a processing additive (E), which were used in examples and comparative examples below, are as follows.

(A) Polypropylene Polymer (PP)

A polypropylene random copolymer (manufactured by Polymirae, product name: EC 5082) including ethylene-butene rubber (EBR) in a content of 7% and having a melt index (230° C./2.16 kg) of 23 g/10 min was used.

(B-1) Styrene Block Copolymer (SBC 1)

A styrene-ethylene-butylene-styrene (SEBS) copolymer (manufactured by Kraton, product name: SEBS G 1657) including styrene in a content of 13% and having a weight-average molecular weight of 105,000 g/mol was used.

(B-2) Styrene Block Copolymer (SBC 2)

A styrene-ethylene-butylene-styrene (SEBS) copolymer (manufactured by LCY Chemical, product name: LCY 9557) including styrene in a content of 13% and having a weight-average molecular weight of 100,000 g/mol was used.

(C) Poly(arylene ether) Resin (PPE)

A poly(phenylene ether) resin (manufactured by Mitsubishi Engineering Plastics, product name: PX 100F) having a viscosity of 0.38±0.02 dl/g was used.

(D) Phosphorus Flame Retardant (FR)

Aluminum diethyl phosphinate (manufactured by Clariant, product name: OP 1230) including phosphorus in a content of 23 to 24% was mixed with bisphenol-A-diphenylphosphate (manufactured by Adeka, product name: FP-600), as an organophosphate-based flame retardant in liquid state at room temperature, and melamine-polyphosphate (manufactured by DOOBON, product name: NON-FLA 601) including nitrogen in a content of 39 to 42% and phosphorus in a content of 14 to 17%, as a nitrogenous/phosphorus flame retardant in solid state at room temperature.

(E) Processing Additive

A mixture of a lubricant, an antioxidant, and the like was used.

Example 1

30% by weight of the polypropylene polymer (A), 20% by weight of the styrene block copolymer (B-1), 17% by weight of the poly(arylene ether) resin (C), 30% by weight of the phosphorus flame retardant (D) (15% by weight of aluminum diethyl phosphinate, 6% by weight of bisphenol-A-diphenylphosphate, and 9% by weight of melamine-polyphosphate) and 3% by weight of the processing additive (E) were mixed using a super mixer. A resultant mixture was mixed using a super mixer, and melted and kneaded in a temperature section of 200 to 290° C. by means of a twin-screw extruder, followed by being extruded. As a result, a pellet-type resin composition was prepared.

The prepared pellet-type resin composition was dried at 80° C. for four hours and then left for a day at room temperature, followed by being extruded at 230 to 260° C. and a linear velocity of 80 rpm and 30 m/min by means of a wire coating extruder (19 Ø HAAKE extruder manufactured by Thermo Scientific, Germany). As a result, a cable specimen was manufactured.

Example 2

A cable specimen was manufactured in the same manner as in Example 1, except that the styrene block copolymer (B-2) was used, in the same amount as that of the styrene block copolymer (B-1), instead of the styrene block copolymer (B-1).

Example 3

A cable specimen was manufactured in the same manner as in Example 1, except that 25% by weight of the polypropylene polymer (A), 20% by weight of the styrene block copolymer (B-1), 17% by weight of the poly(arylene ether) resin (C), 35% by weight of the phosphorus flame retardant (D), and 3% by weight of the processing additive (E) were used, as summarized in Table 1 below.

Comparative Example 1

A cable specimen was manufactured in the same manner as in Example 1, except that the poly(arylene ether) resin (C) was not used, and 38% by weight of the polypropylene polymer (A), 25% by weight of the styrene block copolymer (B-1), 35% by weight of the phosphorus flame retardant (D) (20% by weight of aluminum diethyl phosphinate, 10% by weight of bisphenol-A-diphenylphosphate, and 5% by weight of melamine-polyphosphate), and 2% by weight of the processing additive (E) was mixed and used.

Comparative Example 2

A cable specimen was manufactured in the same manner as in Example 1, except that 30% by weight of the polypropylene polymer (A), 20% by weight of the styrene block copolymer (B-1), 30% by weight of the poly(arylene ether) resin (C), 17% by weight of the phosphorus flame retardant (D) (8% by weight of aluminum diethyl phosphinate, 4% by weight of bisphenol-A-diphenylphosphate, and 5% by weight of melamine-polyphosphate), and (E) 3% by weight of a processing additive were mixed and used.

Comparative Example 3

A cable specimen was manufactured in the same manner as in Example 1, except that 20% by weight of the polypropylene polymer (A), 10% by weight of the styrene block copolymer (B-1), 20% by weight of the poly(arylene ether) resin (C), 48% by weight of the phosphorus flame retardant (D) (20% by weight of aluminum diethyl phosphinate, 20% by weight of bisphenol-A-diphenylphosphate, and 8% by weight of melamine-polyphosphate), and 2% by weight of the processing additive (E) were mixed and used.

Comparative Example 4

A cable specimen was manufactured in the same manner as in Example 1, except that 20% by weight of the polypropylene polymer (A), 10% by weight of the styrene block copolymer (B-1), 48% by weight of the poly(arylene ether) resin (C), 20% by weight of the phosphorus flame retardant (D) (10% by weight of aluminum diethyl phosphinate, 5% by weight of bisphenol-A-diphenylphosphate, and 5% by weight of melamine-polyphosphate), and 2% by weight of the processing additive (E) were mixed and used.

Comparative Example 5

A cable specimen was manufactured in the same manner as in Example 1, except that 15% by weight of the polypropylene polymer (A), 30% by weight of the styrene block copolymer (B-1), 30% by weight of the poly(arylene ether) resin (C), 20% by weight of the phosphorus flame retardant (D) (10% by weight of aluminum diethyl phosphinate, 5% by weight of bisphenol-A-diphenylphosphate, and 5% by weight of melamine-polyphosphate), and 5% by weight of the processing additive (E) were mixed and used.

Comparative Example 6

A cable specimen was manufactured in the same manner as in Example 1, except that 33% by weight of the polypropylene polymer (A), 23% by weight of the styrene block copolymer (B-1), 13% by weight of the poly(arylene ether) resin (C), 25% by weight of the phosphorus flame retardant (D) (12% by weight of aluminum diethyl phosphinate, 8% by weight of bisphenol-A-diphenylphosphate, and 5% by weight of melamine-polyphosphate), and 6% by weight of the processing additive (E) were mixed and used.

Comparative Example 7

A cable specimen was manufactured in the same manner as in Example 1, except that 25% by weight of the polypropylene polymer (A), 20% by weight of the styrene block copolymer (B-1), 13% by weight of the poly(arylene ether) resin (C), 40% by weight of the phosphorus flame retardant (D) (25% by weight of aluminum diethyl phosphinate, 6% by weight of bisphenol-A-diphenylphosphate, and 9% by weight of melamine-polyphosphate), and 2% by weight of the processing additive (E) were mixed as summarized in Table 1 below and used.

Comparative Example 8

A cable specimen was manufactured in the same manner as in Example 1, except that 25% by weight of the polypropylene polymer (A), 20% by weight of the styrene block copolymer (B-1), 15% by weight of the poly(arylene ether) resin (C), 25% by weight of the phosphorus flame retardant (D) (20% by weight of aluminum diethyl phosphinate, 6% by weight of bisphenol-A-diphenylphosphate, and 9% by weight of melamine-polyphosphate), and 15% by weight of the processing additive (E) were mixed as summarized in Table 1 below and used.

[Test Example]

The properties of the cable specimen manufactured using the polypropylene resin composition prepared according to each of Examples 1 to 3 and Comparative Examples 1 to 8 were measured according to the following methods. Results are summarized in Table 1 below.

Measurement Method

※ Weight average molecular weight: Measured by GPC. A measurement method was as follows:

※ <Analytical instrument>

Column: Polymer Lab mixed B×2

Solvent: Tetrahydrofuran (0.45 μm filtered)

Flow: 1.0 ml/min

Injection volume: 100 μL (0.45 μm filtered)

Running time: 25 min

Detector: Agilent RI detector

<Experimental Process>

1) A proper amount of the sample was dissolved to concentration of 1 mg/ml in THF, followed by filtration through a 0.45 μm syringe filter.

2) The sample solution was injected to obtain a GPC chromatogram.

3) A standard solution was injected to obtain a GPC chromatogram.

4) A calibration curve and equation were obtained from the chromatogram of a standard solution. A retention time of the sample solution was substituted into the equation to obtain the weight average molecular weight of the sample.

※ Cable appearance evaluation: Visually inspected and measured according to the method specified in UL 1581 upon extrusion of the cable.

※ Tensile strength (kgf/cm$^2$): Measured according to the method specified in UL 1581 using the cable specimen.

※ Tensile elongation (%): Measured according to the method specified in UL 1581 using the cable specimen.

※ Flame resistance (VW-1): Measured according to the method specified in UL 1581 using the cable specimen.

※ Melt index (g/10 min): Measured according to the standard test method ASTM D1238 (230° C./2.16 kg).

※ Hardness (Shore A): Measured according to the standard test method ASTM D2240.

TABLE 1

| Classification | | Examples | | | Comparative Examples | | | | | | | |
|---|---|---|---|---|---|---|---|---|---|---|---|---|
| | | 1 | 2 | 3 | 1 | 2 | 3 | 4 | 5 | 6 | 7 | 8 |
| (A) PP (% by weight) | | 30 | 30 | 25 | 38 | 30 | 20 | 20 | 15 | 33 | 25 | 25 |
| (B-1) SBC 1 (% by weight) | | 20 | — | 20 | 25 | 20 | 10 | 10 | 30 | 23 | 20 | 20 |
| (B-2) SBC 2 (% by weight) | | — | 20 | — | — | — | — | — | — | — | — | — |
| (C) PPE (% by weight) | | 17 | 17 | 17 | — | 30 | 20 | 48 | 30 | 13 | 13 | 15 |
| (D) FR | Aluminum-diethylphosphinate | 15 | 20 | 20 | 8 | 20 | 10 | 10 | 10 | 12 | 25 | 20 |
| | Bisphenol-A-diphenylphosphate | 9 | 10 | 9 | 4 | 20 | 5 | 5 | 5 | 8 | 6 | 6 |
| | Melamine-polyphosphate | 6 | 5 | 6 | 5 | 8 | 5 | 5 | 5 | 5 | 9 | 9 |
| Total(% by weight) | | 30 | 35 | 35 | 17 | 48 | 20 | 20 | 20 | 25 | 40 | 25 |
| (E) Additives | | 3 | 3 | 3 | 2 | 3 | 2 | 2 | 5 | 6 | 2 | 15 |
| Mechanical characteristics of cable specimens | | | | | | | | | | | | |
| Melt index (MI 230° C./2.16 kg, g/10 min) | | 3 | 4.5 | 1.1 | 17 | 1.4 | 2.2 | 0.4 | 0.3 | 11 | 3.1 | 5.4 |
| Tensile strength (room temperature TS, kgf/cm2) | | 121 | 104 | 116 | 141 | 88 | 91 | 69 | 93 | 128 | 116 | 101 |

TABLE 1-continued

| Classification | Examples | | | Comparative Examples | | | | | | | |
|---|---|---|---|---|---|---|---|---|---|---|---|
| | 1 | 2 | 3 | 1 | 2 | 3 | 4 | 5 | 6 | 7 | 8 |
| Tensile elongation (room temperature TE, %) | 215 | 271 | 264 | 271 | 141 | 89 | 42 | 167 | 292 | 212 | 234 |
| Hardness (Shore A) | 88 | 90 | 87 | 87 | 92 | 92 | 94 | 90 | 87 | 89 | 88 |
| Flame resistance (VW-1) | PASS | PASS | PASS | Fail | Pass | Fail | Pass | Pass | Fail | PASS | Fail |
| Characteristics upon cable extrusion | | | | | | | | | | | |
| Torque upon extrusion (Nm) | 19 | 17 | 21 | 22 | 27 | 22 | 31 | 38 | 13 | 24 | 19 |
| Press upon extrusion (bar) | 35 | 34 | 33 | 42 | 41 | 30 | 27 | 49 | 27 | 40 | 36 |
| Extrusion processability | ⊚ | ⊚ | ⊚ | ⊚ | Δ | Δ | X | X | ○ | X | ○ |

※ Extrusion processability: Classified into four stages based on appearance quality and productivity upon cable extrusion (⊚ - very good, ○ - good, Δ - average, X - poor).

As shown in [Table 1], all of the polypropylene resin compositions of the present invention have a superior melt index (230° C./2.16 kg) of 3 g/10 min or more, are very flexible (tensile strength of 100 kgf/cm$^2$ or more and tensile elongation of 150% or more), have a superior Shore A hardness range of 80 to 95, and passed the flame resistance test by realizing flame retardancy without use of an excessive amount of a flame retardant. Accordingly, it can be confirmed that the overall mechanical properties of all of the polypropylene resin compositions of the present invention and balance therebetween are very superior. In addition, in the poly(arylene ether) resin compositions of the present invention, the torque and pressure required upon cable extrusion, 20 Nm or less and 35 bar or less, respectively, are low. Accordingly, it can be confirmed that the poly(arylene ether) resin compositions of the present invention provide superior cable appearance quality and overall superior extrusion processability.

On the other hand, it can be confirmed that, in the case of Comparative Examples 1 not including the poly(arylene ether) resin, flame resistance is decreased.

In addition, it can be confirmed that, in the cases of Comparative Examples 2, 4 and 5, in which the content of the flame retardant was below the range of the present invention, and the poly(arylene ether) resin was added in a higher amount than the range of the present invention, flame resistance is secured, but overall mechanical properties are rapidly deteriorated.

In addition, it can be confirmed that, in the case of Comparative Examples 3 in which the contents of the polypropylene polymer and styrene block copolymer were below the range of the present invention and the flame retardant was added in an excessive amount, the appearance of a cable is poor and the cable does not pass the VW-1 test for measuring flame resistance. Further, it can be confirmed that, in the case of Comparative Examples 3, properties, such as tensile strength and tensile elongation, are remarkably decreased.

In addition, it can be confirmed that, in the case of Comparative Examples 6 in which the contents of the poly(arylene ether) resin and flame retardant were below the range of the present invention, flame resistance is deteriorated.

Further, it can be confirmed that, in Comparative Examples 7, in which the phosphorus flame retardant was used in an excessive amount, and Comparative Examples 8, in which the processing additive was used in an excessive amount, flame resistance, extrusion processability, etc. are greatly deteriorated.

In conclusion, it can be confirmed that the polypropylene resin compositions of the present invention prepared by mixing the polypropylene polymer with the poly(arylene ether) resin within the specific content range, and the cables cladded with the polypropylene resin compositions exhibit excellent flame resistance, insulation performance, processability, and property balance while including a small amount of flame retardant.

The invention claimed is:

1. A polypropylene resin composition, comprising 25 to 35% by weight of a polypropylene polymer, 15 to 25% by weight of a styrene block copolymer, 15 to 25% by weight of a poly(arylene ether) resin, 26 to 35% by weight of a phosphorus flame retardant, and 0 to 10% by weight of a processing additive,
   wherein an ethylene-butene rubber (EBR) content in the polypropylene polymer is 1 to 20% by weight.

2. The polypropylene resin composition according to claim 1, wherein the polypropylene polymer is a copolymer of propylene; and one or more olefins selected from the group consisting of ethylene, 1-butene, 4-methyl-1-pentene, 1-hexene, and 1-octene.

3. The polypropylene resin composition according to claim 1, wherein the polypropylene polymer is a polypropylene random copolymer.

4. The polypropylene resin composition according to claim 1, wherein a melt index (230° C./2.16 kg) of the polypropylene polymer is 16 to 25.

5. The polypropylene resin composition according to claim 1, wherein the styrene block copolymer is a styrene-ethylene-butylene-styrene copolymer.

6. The polypropylene resin composition according to claim 1, wherein a styrene content in the styrene block copolymer is 10 to 20% by weight.

7. The polypropylene resin composition according to claim 1, wherein the styrene block copolymer has a weight average molecular weight of 80,000 to 120,000 g/mol.

8. The polypropylene resin composition according to claim 1, wherein the poly(arylene ether) resin is a poly (phenylene ether) resin.

9. The polypropylene resin composition according to claim 1, wherein the phosphorus flame retardant is one or more selected from the group consisting of an organometallic phosphinate-based flame retardant, a nitrogenous/phosphorus flame retardant in solid state at room temperature, and an organophosphate-based flame retardant in liquid state at room temperature.

10. The polypropylene resin composition according to claim 9, wherein the organometallic phosphinate is metal dialkyl phosphinate.

11. The polypropylene resin composition according to claim 9, wherein the organophosphate-based flame retardant in liquid state at room temperature is bisphenol A bis(dialkyl phosphate), bisphenol A bis(diaryl phosphate), or a combination thereof.

12. The polypropylene resin composition according to claim 1, wherein the processing additive comprises one or more selected from the group consisting of a lubricant, an antioxidant, a light stabilizer, a chain extender, a reaction catalyst, a release agent, a pigment, a dye, an antistatic agent, an antimicrobial agent, a processing aid, a metal deactivator, a smoke suppressant, a fluorine-based antidripping agent, an inorganic filler, a glass fiber, an antifriction and antiwear agent, and a coupling agent.

13. The polypropylene resin composition according to claim 1, wherein the polypropylene resin composition has a melt index (230° C./2.16 kg) of 1 g/10 min or more.

14. The polypropylene resin composition according to claim 1, wherein the polypropylene resin composition has a tensile strength of 100 kgf/cm$^2$ or more.

15. The polypropylene resin composition according to claim 1, wherein polypropylene resin composition has a tensile elongation of 150% or more.

16. The polypropylene resin composition according to claim 1, wherein the polypropylene resin composition has a Shore A hardness of 80 or more.

17. A cable, wherein an outermost layer of the cable is cladded with the polypropylene resin composition according to claim 1.

* * * * *